United States Patent [19]

Hanks et al.

[11] Patent Number: 4,633,991
[45] Date of Patent: Jan. 6, 1987

[54] COUPLING CLUTCH HAVING AXIALLY CAPTURED, ROTATABLE HOUSING

[75] Inventors: James V. Hanks, Robbinsdale; Charles D. Raines, Blaine; Leonid Dayen, Plymouth, all of Minn.

[73] Assignee: Horton Manufacturing Co., Inc., Minneapolis, Minn.

[21] Appl. No.: 761,196

[22] Filed: Jul. 31, 1985

Related U.S. Application Data

[63] Continuation-in-part of Ser. No. 715,736, Mar. 25, 1985, Pat. No. 4,624,356, which is a continuation-in-part of Ser. No. 630,370, Jul. 12, 1984, Pat. No. 4,606,447.

[51] Int. Cl.$^4$ ............................................. F16D 25/08
[52] U.S. Cl. .............................. 192/85 CA; 192/67 R; 192/70.28
[58] Field of Search ................. 192/67 R, 70.28, 85 C, 192/85 CA, 110 R, 70.16, 114 T, 109 A, 110 B

[56] References Cited

U.S. PATENT DOCUMENTS 2,384,418  9/1945  Edmondson .................. 192/67 R
3,760,916  9/1973  Hanks et al. .................. 192/67 R Primary Examiner—George H. Krizmanich
Attorney, Agent, or Firm—Peterson, Wicks, Nemer & Kamrath

[57] ABSTRACT

A coupling clutch is shown in its most preferred form as including first and second hubs having first and second splined interface discs received thereon. The first interface disc is biased away from the second interface disc and is movable towards the second interface disc by a piston reciprocally mounted to a housing and rotatably mounted to the first interface disc by a bearing mounted therebetween. The splines between the second interface disc and the second hub allow the second interface disc to cant to compensate for axial angular misalignment of the first and second hubs. The housing is further rotatably mounted to the second interface disc. A radially extending, annular lip is provided on the housing which is axially captured between a shoulder and a retaining ring provided on the first hub. Bushing bumpers are provided between the lip and the shoulder and between the retaining ring and the lip. Thus, axial movement of the housing is prevented with respect to the hub. In its most preferred form, the first disc includes a multiplicity of ball-receiving cavities and the second disc includes a carrier member having a multiplicity of balls allowing the same degrees of registry of the first and second discs during clutch activation.

21 Claims, 3 Drawing Figures

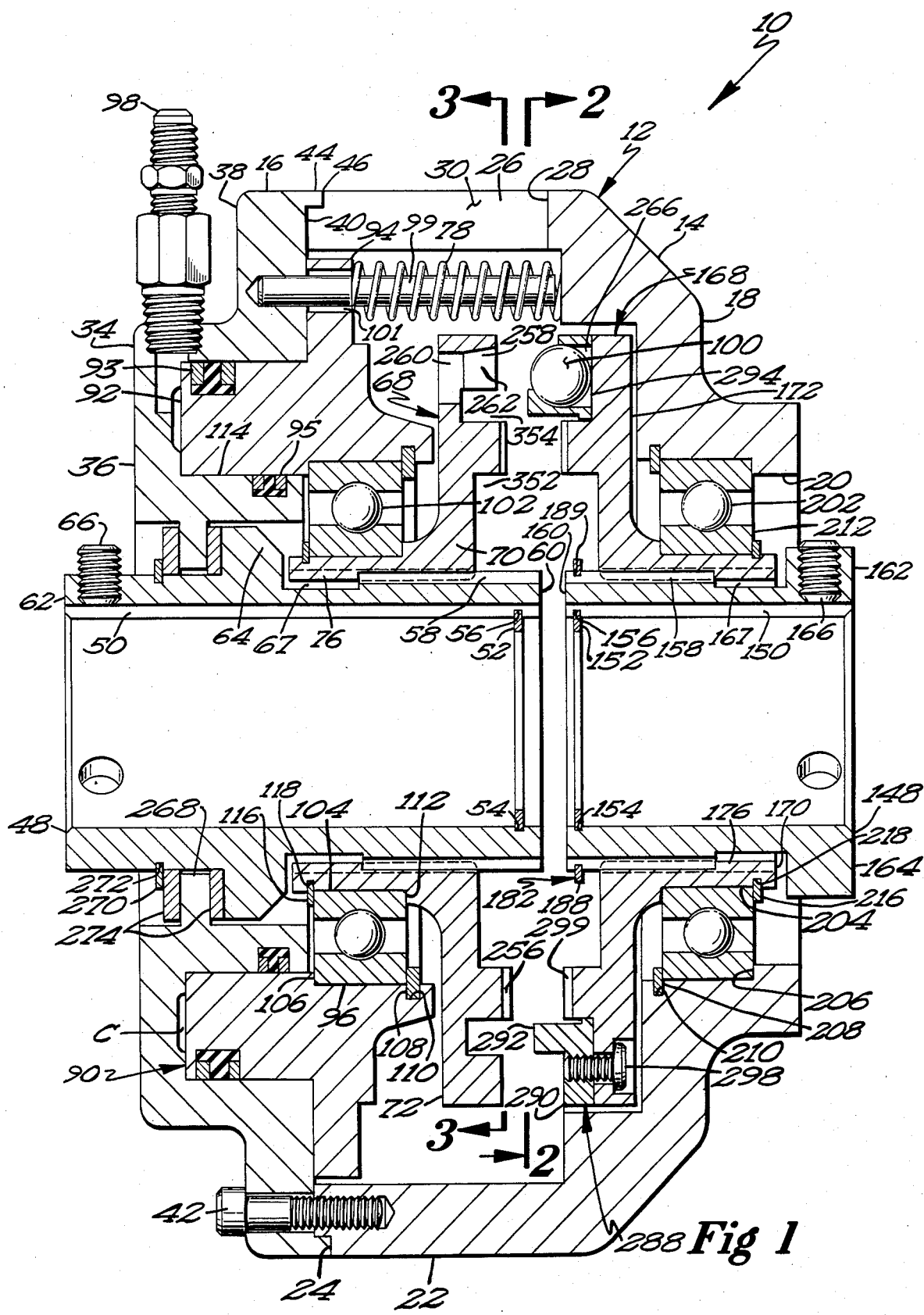

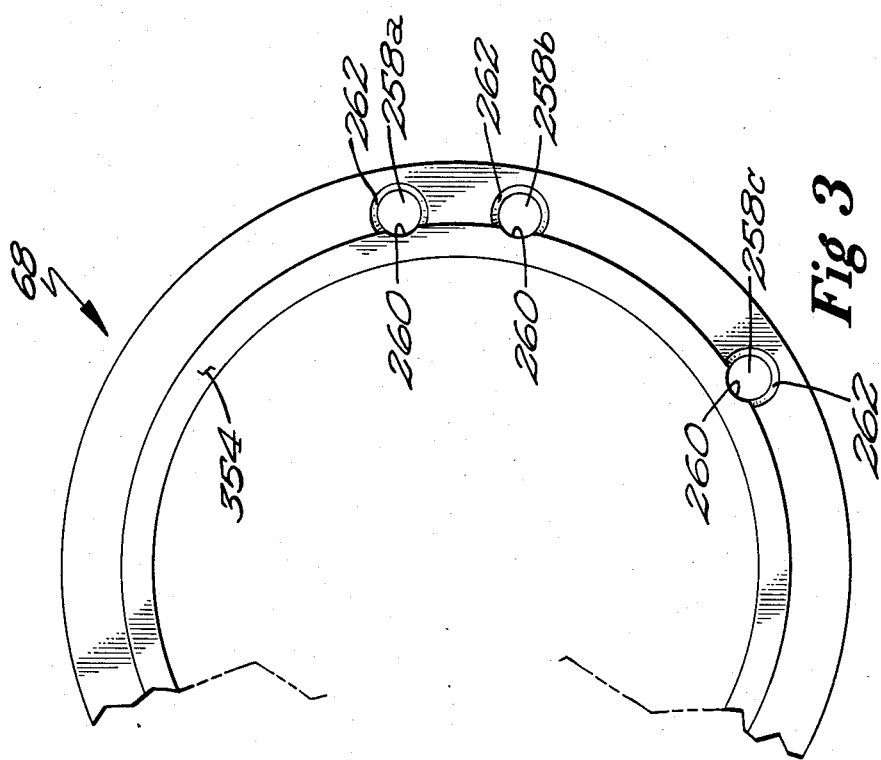
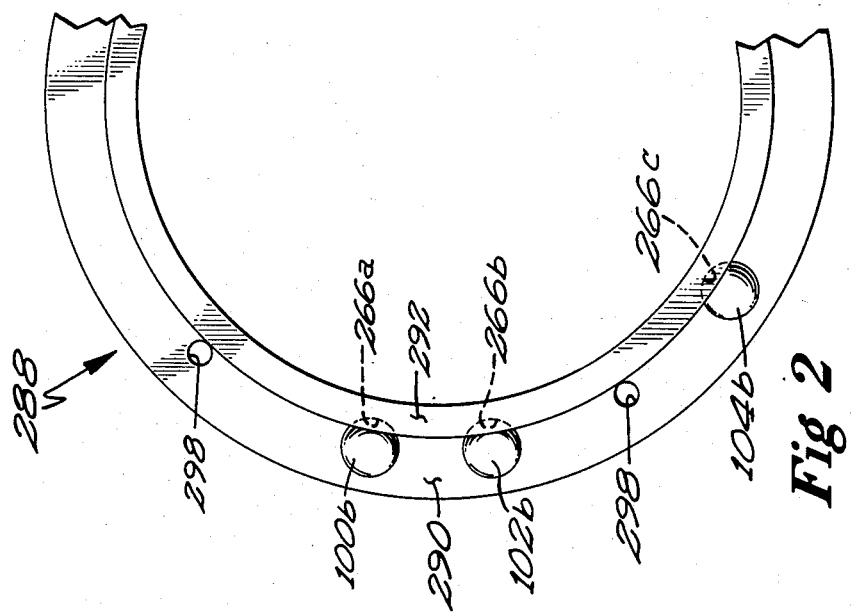

COUPLING CLUTCH HAVING AXIALLY CAPTURED, ROTATABLE HOUSING

This application is a continuation-in-part of application Ser. No. 715,736, filed on Mar. 25, 1985, now U.S. Pat. No. 4,624,356 which is a continuation-in-part of application Ser. No. 630,370, filed on July 12, 1984, now U.S. Pat. No. 4,606,447.

BACKGROUND OF THE INVENTION

The present invention relates generally to rotational control apparatuses and particularly to coupling clutches and more specifically to clutches engageable in driving positions with which the input and output always come to the same degrees of registry for rotation of the output.

It is often desirable to couple first and second mutually rotating parts such as shafts and to controllably rotatably relate them together. Coupling clutches can be utilized in these situations. However, coupling clutches suffered from problems resulting from the horizontal and angular misalignment of the shafts. Furthermore, in the printing industry, for example, where sheet material must be put through a run a second time and register with a previous sheet position, it is desired to allow a declutched element to be clutched in to the same previous position relative to a member of the machine running the sheet material.

Prior clutches which accomplish this need generally include a ball carrier on the output side of the clutch, the balls of which keep the face of the input drive ring perpendicular to the sliding axis of the hub which provides lateral support between the drive ring and the ball carrier. The balls prevent a torque output during the seeking of registry of the balls of the ball carrier with the cavities of the drive ring. With registry, the teeth of the drive ring engage teeth of this ball carrier output member.

However, such prior clutches may be prone to unwarranted clutch engagement as the result of the balls dislodging from the ball carrier due to wear, clutch failure, and the like and jamming between the input and output interfaces. Such undesired engagement may cause damage to the machinery which the apparatus controls, the work piece which is being operated upon by such machinery, and/or the personnel operating or attempting to repair or maintain such machinery. Thus, a need has arisen for clutches preventing undesired and unwarranted clutch engagement as the result of dislodged balls jamming between the input and the output of the clutch.

SUMMARY

The present invention solves these and other problems by providing in its most preferred form a coupling clutch including first and second hubs for receipt of shafts. Further provided are first and second interface discs for slideable receipt on the first and second hubs, respectively. The first interface disc is biased in a first axial direction and is selectively movable in the opposite axial direction for the selective engagement of the first and second interface discs. Although slideably mounted, the second interface disc is substantially prevented from sliding on the second hub for allowing canting of the second interface disc with respect to the second hub to take up angular misalignment of the first and second shafts.

The present invention also solves these and other problems by providing in its most preferred form a clutch where the output always comes to the same degrees of registry with the input by providing an improved clutch having safety features for preventing unwarranted engagement of the clutch. In the preferred form of the improved clutch, a first degree of safety is provided by including a unique relationship between the size of the projections of the clutch and the gap between the interface surfaces in an nonengaged position. Specifically, the nonengaged interface gap is larger than the size of the projections for preventing any dislodged projections from jamming between the interface surfaces and resulting in unwarranted engagement of the clutch.

In the preferred form of the improved clutch, another degree of safety is provided by including an improved projection carrier ring. Specifically, the carrier ring includes a flat radial ring portion and an inner axial, annular flange which aids in preventing any dislodged projections from traveling radially inward of the clutch and jamming the interface members causing unwarranted engagement of the clutch and which aids in allowing any dislodged projections to travel outward of the clutch and away from the interface members of the clutch.

It is thus an object of the present invention to provide a novel rotational control apparatus including safety features.

It is thus an object of the present invention to provide a novel rotational control apparatus tending to prevent unwarranted engagement of the rotational control apparatus.

It is thus an object of the present invention to provide a novel clutch including safety features.

It is thus an object of the present invention to provide a novel clutch tending to prevent unwarranted clutch engagement.

It is thus an object of the present invention to provide a novel clutch which prevents jamming of registry projections between the input and the output of the clutch. It is thus an object of the present invention to provide a novel coupling clutch.

It is further an object of the present invention to provide such a novel coupling clutch which compensates for angular misalignment of the coupled shafts.

It is further an object of the present invention to provide such a novel coupling clutch which compensates for horizontal misalignment of the coupled shafts.

It is further an object of the present invention to provide such a novel coupling clutch which provides self-balancing of the interface engagement surfaces.

It is further an object of the present invention to provide such a novel clutch engageable in driving positions with which the input and output always come to the same degrees of registry for rotation of the output.

It is further an object of the present invention to provide such a novel clutch engageable in a single driving position.

It is further an object of the present invention to provide such a novel clutch which allows dislodged registry projections to travel out of the clutch.

It is thus an object of the present invention to provide such a novel clutch which restricts the passage of dislodged registry projections radially inward into the clutch.

It is further an object of the present invention to provide such a novel clutch having a unique relationship between the size of the registry projections and the spacing between the input and output interfaces.

It is further an object of the present invention to provide such a novel clutch allowing ease of heat treating of the registry projection receiving cavities.

It is further an object of the present invention to provide such a novel clutch having a more rigid formation of the registry projection receiving cavities.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a full cross-sectional view of a fully assembled coupling clutch constructed according to the teachings of the present invention.

FIG. 2 shows a partial, side view of a component of the clutch of FIG. 1 according to view line 2—2 of FIG. 1.

FIG. 3 shows a partial, side view of a component of the clutch of FIG. 1 according to the view line 3—3 of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", and similar terms are used herein, it should be understood that these terms have reference only to the structure shown in the drawings as it would appear to a person viewing the drawings and are utilized only to facilitate describing the invention.

DESCRIPTION OF THE INVENTION

A coupling clutch according to the teachings of the present invention is shown in the drawings and is generally designated 10. Clutch 10 includes a stationary housing 12 including in its most preferred form a first shell 14 and a second shell 16. First shell 14 includes a generally annular portion 18 having an inner edge terminating in a bearing mounting surface 20 and an outer edge terminating in a right angular or axially extending flange 22. Flange 22 terminates in an annular abutment edge 24. Openings 26 are formed in flange 22 extending inwardly from edge 24 and terminating in a spaced relation from the outer edge of annular portion 18. In its most preferred form, openings 26 are generally U-shaped extending from edge 24 terminating in edge 28 which is parallel to edge 24 and having side edges 30 extending generally perpendicular to edges 24.

Second shell 16 includes a generally annular portion 34 having an inner, annular body portion 36 terminating in a radially extending, integral flange 38. Flange 38 terminates in an annular edge 40. Housing 12 is formed by securing shells 14 and 16 together with edges 24 and 40 of flanges 22 and 38, respectively, abutting together. In its most preferred form, shells 14 and 16 are secured by bolts 42 extending through flange 38 of shell 16 and threadably received in flange 22 of shell 14 between openings 26. In its most preferred form, edge 40 includes an axially extending shoulder 44 and edge 24 includes a removed portion 46 complementary to and for receipt of shoulder 44. Thus, portion 46 and shoulder 44 provide an interlocking relation between shells 14 and 16.

Clutch 10 further includes a hub 48 for receiving a shaft not specifically shown. Suitable keyway means 50 can further be provided for preventing relative rotation between the shaft and hub 48. A retainer ring 52 such as a snap ring can further be provided in a radially extending cavity 54 for preventing the shaft from going in too far. Keyway 50 can further include a radially extending cavity 56 formed on the outside surface for receipt of retainer ring 52 for holding keyway 50 in the desired position and preventing axial movement.

Splines 58 are formed on the outside surface of hub 48 extending from its first, axially inward end 60 to a point spaced from its second, axially outward end 62. An annular shoulder 64 is formed adjacent the axially, outward point of splines 58. In its most preferred form, set screws 66 are provided in hub 48 which abut with the shaft and the keyway 50 for removeably securing the shaft in hub 48. In its most preferred form, hub 48 includes an annular groove 67 formed in the outer circumference of hub 48 and extending axially from shoulder 64 to the axial extent of splines 58.

Clutch 10 further includes a driven interface disc 68 including a hub portion 70 and a radially extending flange 72. In its most preferred form, the face of radially extending interface flange 72 is formed with the rotational interface surface shown in its most preferred form as an annular ring of teeth 256. Formed adjacent but radially inward of the periphery of the annular flange 72 are the five spaced ball-receiving cavities 258 illustrated in the drawings by cavities 258a, 258b, and 258c. In their most preferred form, cavities 258 are formed by a first bore 260 which extends axially through flange 72 of drive disc 68 and a countersunk type detent 262 having angular sides. Bore 260 has a diameter slightly smaller than the diameter of the projections shown as balls 100b, 102b, and 104b. Detent 262 has a first axially outward, open end having a diameter slightly greater than the diameter of balls 100b, 102b, and 104b and has a second axially inward end terminating in bore 260. Hub portion 70 includes splines 76 complementary to and for sliding receipt on splines 58 of hub 48.

For purposes of sliding interface disc 68 on splines 58 against the bias of springs 78, a piston 90 is further provided slideably mounted to housing 12. In its most preferred form, piston 90 is annular having an annular body portion 92 and an integral, radially extending, annular leg 94. A bearing mount 96 is formed on the radially inward surface of body portion 92. Annular body portion 36 of shell 16 includes an axially extending cavity 114 haing a size complementary to and for receipt of body portion 92 of piston 90. Suitable sealing means 93 can be provided between the radially outward surfaces of body portion 92 and cavity 114 such as a T-seal seated on the radially outward surface of body portion 92. Suitable sealing means 95 can be provided between the radially inward surfaces of body portion 92 and cavity 114 such as a T-seal seated in the radially inward surface of cavity 114. Thus, a cylinder C is formed by and between cavity 114 of shell 16 and body portion 92 of piston 90. Suitable provisions 98 are provided for supplying fluid pressure to cylinder C. The radially outward surface of leg 94 abuts with flange 38 of shell 16. Torque pins 99 can be provided extending axially from flange 38 and through axial apertures 101 formed in leg 94 for purposes of slideably mounting and rotatably relating piston 90 with respect to shell 16 of housing 12. In its most preferred form, torque pins 99 are located radially outwardly of body portion 92 of piston 90 and interface disc 68.

Piston 90 is rotatably mounted by a bearing 102 located between mount 96 of piston 90 and bearing mount 104 formed on interface disc 68. In its most preferred form, the outer race of bearing 102 is captured between a shoulder 106 extending radially from mount 96 and a retaining ring 108 received in a cavity 110 extending radially into mount 96. The inner race of bearing 102 abuts with a shoulder 112 extending radially outward from mount 104 of friction disc 68 and a retaining ring 116 received in a cavity 118 extending radially into mount 104.

Due to their common connection with bearing 102, friction disc 68 slides along hub 48 by splines 76 and 58 with piston 90 movement. Thus, piston 90 and interface disc 68 are axially interrelated, i.e., maintain the same axial positions with respect to each other, but are rotatably independent from each other. Interface disc 68 is biased on splines 76 and 58 towards shoulder 64 by springs 78 received on torque pins 99 and extending and abutting between leg 94 of piston 90 and annular portion 18 of shell 14.

Thus, it should be appreciated that bearing 102 rotatably mounts shell 16 of housing 12 and piston 90 with respect to hub 48 and interface disc 68. Further, it should be noted that piston 90 and friction disc 68 are slideable with respect to shell 16 of housing 12 and with respect to hub 48. Specifically, if fluid pressure is introduced through provision 98 into cylinder C, piston 90 slides on shell 16 of housing 12.

Clutch 10 further includes a hub 148 for receiving a shaft not specifically shown. Suitable keyway means 150 can further be provided for preventing relative rotation between the shaft and hub 148. A retainer ring 152 such as a snap ring can further be provided in a radially extending cavity 154 for preventing the shaft from going in too far. Keyway 150 can further include a radially extending cavity 156 formed on the outside surface for receipt of retainer ring 152 for holding keyway 150 in the desired position and preventing axial movement.

Splines 158 are formed on the outside surface of hub 148 extending from its first, axially inward end 160 to a point spaced from its second, axially outward end 162. An annular shoulder 164 is formed adjacent the second, axially outward end 162 having a radial extent greater than that of spines 158. In its most preferred form, set screws 166 are provided in shoulder 164 which abut with the shaft and the keyway 150 for removeably securing the shaft in hub 148. In its most preferred form, hub 148 includes an annular groove 167 formed in the outer circumference of hub 148 and extending axially from shoulder 164 to the axial extent of splines 158.

Clutch 10 further includes a drive interface disc 168 including a hub portion 170 and a radially extending flange 172. Hub portion 170 includes splines 176 complementary to and for sliding receipt on splines 158 of hub 148.

Interface disc 168 is prevented from moving in a first axial direction by shoulder 164 and is prevented from moving in the opposite axial direction by a retaining member 182. Member 182 is shown in its most preferred form as a retaining ring 188 received in a radially extending cavity 189 formed in the outside surface of hub 148. Thus, shoulder 164 and retaining ring 188 substantially prevent slideable movement of friction disc 168 on hub 148.

Shell section 14 of housing 12 is rotatably mounted by a bearing 202 located between mount 20 of section 14 and bearing mount 204 formed on friction disc 168. In its most preferred form, the outer race of bearing 202 is captured between a shoulder 206 extending radially from mount 20 and a retaining ring 208 received in a cavity 210 extending radially into mount 20. The inner race of bearing 202 is captured between a shoulder 212 extending radially outward from mount 204 of interface disc 168 and a retaining ring 216 received in a cavity 218. Thus, it should be appreciated that bearing 202 rotatably mounts shell 14 of housing 12 with respect to hub 148 and interface disc 168.

The numeral 288 designates a ball carrier ring formed of the flat radially disposed ring portion 290 terminating in its inner edge in the right angular annular inner flange 292. The ball carrier ring is secured in a recess 294 formed in the annular, output interface flange 172 by means of the bolts 298. Formed on the inner face of the flange 172 is the rotational interface surface shown in its most preferred form as teeth 299 which are in axial alignment with and engageable with the teeth 256 of the drive disc 68. The ball carrier ring 288 has formed in the ring portion 290 and the flange 292 thereof the ball sockets 266 which are in alignment with the ball cavities 258 of the drive disc 68. The balls 100b, 102b, and 104b are mounted on the flange 172 by placing the balls first in the sockets 266 of the ring 288 and then ring 288 with balls 100b, 102b, and 104b is secured to flange 172 thereby mounting the balls on flange 172.

In its most preferred form, housing 12 includes an annular placement lip 268 radially extending from the radially inward surface of annular body portion 36. Lip 268 is axially captured on hub 48 by a retaining ring 270 received in a cavity 272 extending radially into hub 48 and by shoulder 64 of hub 48. Bushing bumpers 274 are further provided intermediate lip 268 and retaining ring 270 and intermediate lip 268 and shoulder 64.

Fluid pressure is introduced into inlet 98 thereby causing the piston 90 to move axially and cause the drive disc 68 to also move axially as it rotates whereby the cavities 258 seek register with the balls 100b-104. Generally speaking, with register of the cavities with the balls, the teeth 256 of the drive disc 68 engage and interface with the teeth 299 of driven disc 168 whereby hub 148 is rotated. Torque force is not created until full registry of the balls and teeth and once there is engagement all torque is taken by the teeth engagement and not the balls. It will be seen that all five balls are either in or out of engagement and when not in engagement there is planar support for the drive ring. It will be further seen that with the positioning of the balls, there may be always three balls in a triangle containing the axis of the clutch with engagement of portions of the member between the cavities along the path to support the drive ring before engagement of the teeth 256 with teeth 299 and there is negligible torque output during the seeking of the balls by the cavities.

The subtle details of the preferred relationship of cavities 258, balls 100b, 102b, and 104b and teeth 256 and 299 are set forth and expanded upon in U.S. Pat. No. 3,760,916 which is hereby incorporated herein by reference.

Now that the construction of clutch 10 according to the teachings of the preferred embodiment of the present invention has been set forth, the improvements of the interface of clutch 10 according to the teachings of the present invention over the clutch disclosed in U.S. Pat. No. 3,760,916 and other subtle features and advantages of the present invention can be set forth and appreciated. Specifically, clutch 10 according to the teachings of the present invention has a unique relationship between the size of balls 100b, 102b, and 104b with the distance between teeth 256 and 299 of discs 68 and 168 when clutch 10 is fully disengaged. Prior to the present invention, if dislodged from the carrier ring due to wear or failure of any of the clutch components, the dislodged balls could jam between the teeth of the input and the output of the clutch and result in unwarranted engagement of the clutch. According to the teachings of the present invention, the gap between the input and the output, i.e., the distance between teeth 256 and 299 of discs 68 and 168, respectively when clutch 10 is not engaged, is larger than the largest dimension or diameter of balls 100b, 102b, and 104b. Thus, even if the balls should become dislodged from carrier ring 288 and fall between discs 68 and 168, balls 100b, 102b, and 104b would not jam between teeth 256 and 299 resulting in unwarranted clutch engagement due to their smaller diameter than the gap between teeth 256 and 299. For example, in the preferred embodiment of the present invention, clutch 10 includes balls 100b, 102b, and 104b having diameters equal to one-half inch and the gap between teeth 256 and 299 is greater than one-half inch and in the range of 9/16 inch.

It should further be appreciated that maintaining the same gap between the input and output interfaces of the clutch disclosed in U.S. Pat. No. 3,760,916 but decreasing the size of the balls results in deficiencies from clutch 10 according to the teachings of the present invention. Specifically, operation and production problems may arise as the result of making the balls smaller and the reduction of cavity size will further be required.

Furthermore, drive disc 68 of the present invention has an improved construction from the drive ring of U.S. Pat. No. 3,760,916. Specifically, flange 72 of drive disc 68 is formed of an increased thickness allowing concentric annular recesses 352 and 354 to be formed on the face of flange 72 concentric with and on opposite sides of the annular ring of teeth 256. Recess 352 is located radially inward of teeth 256 and provides relief of stresses placed on flange 72 as the result of teeth 256 and their torque force transfer with and between teeth 299. Recess 354 is located radially outward of teeth 256 and provides a complementary mating cavity for receiving flange 292 of ball carrier ring 288 such that flange 292 does not engage with drive disc 68 to prevent registry of balls 100b, 102b, and 104b within cavities 258 to prevent rotatable engagement of the input and output by teeth 256 and 299.

Furthermore, cavities 258 of the drive disc 68 of the present invention are formed as detents into flange 72 of drive disc 68 located inwardly of the periphery of the drive disc 68 and not as notches formed in the periphery of the drive ring as shown and disclosed in U.S. Pat. No. 3,760,916. Specifically, the notch or half-moon type cavity of the clutch of U.S. Pat. No. 3,760,916 had problems in closing up or "tulipping" when the drive ring was heat treated. With detent type cavities according to the present invention, a solid ring of material the thickness of the flange 72 is created between the radial extent of cavities 258 and the periphery of flange 72 resulting in a more rigid formation and is less likely to distort during heat treatment. Thus, the detent type of cavity of the present invention is clearly advantageous over the peripheral, notch type cavity of U.S. Pat. No. 3,760,916.

Additionally, locating the flange 292 at the radially inner edge of portion 290 of ball carrier ring 288 and thus radially inward of clutch 10 than balls 100b, 102b, and 104b also results in advantageous operation. Specifically, the flange at the radially outward edge of the flat ring portion of the ball carrier ring would tend to hold any dislodged balls within the clutch if they were dislodged from between the flange mount. However, flange 292 at the radially inner edge of portion 290 of ring 288 tends to allow any dislodged balls to travel radially outward and out of clutch 10 and tends to restrict their passage radially inward and into clutch 10 and between teeth 256 and 299. Thus, an additional degree of safety is provided for clutch 10 since unwarranted engagement of clutch 10 is further prevented as the dislodged balls tend to travel out of the clutch rather than jamming between the input and output as may occur in prior clutches.

Thus, it can be appreciated that undesired engagement of clutch 10 as the result of jamming of dislodged balls between the input and output interfaces is prevented with clutch 10 improved according to the teachings of the present invention. This is especially important in clutches of the type and/or variety of U.S. Pat. No. 3,760,916 where specific rotation positions are desired between hubs 48 and 148. Further, the unexpected and often catastrophic running of machines when the clutch unwarrantedly engages possibly damaging the machines, the work piece in the machine, or body parts of the operator located in the machine controlled by the clutch is prevented.

Further, due to the increased gap between the drive disc 68 and driven disc 168, the stroke of piston 90 is likewise increased. Due to this longer stroke, springs extending in the gap may become too long and willowy at the length required to bias the piston its full stroke. Thus, mounting the springs 78 around torque pins 99 radially outward of discs 68 and 168 allows springs 78 to have large diameters to move the piston 90 in the range of two times the stroke of the piston of U.S Pat. No. 3,760,916 and provides the necessary support for the springs 78 to prevent them from becoming willowy and to bias the piston 90 its full stroke and with sufficient biasing force in clutch 10 according to the teachings of the present invention having an increased gap between the input and output interfaces. Furthermore, springs 78 utilized in clutch 10 according to the present invention may be of a variety which is common to springs utilized in other clutch constructions such as coupling variety type clutches.

It should then be noted that when it is necessary to couple a first shaft and a second shaft as in the present invention, the shaft axes are often horizontally misaligned as well as angularly misaligned. Problems arising from misalignment of the shafts are especially prone in rotational control apparatuses which couple first and second shafts and where independently rotating parts connected to the respective shafts frictionally engage or mate with each other to rotationally control or relate the shafts with respect to each other.

The present invention solves this problem by providing a splined connection between interface disc 168 and hub 148 even though sliding of interface disc 168 is undesireable and is substantially prevented from sliding by shoulder 164 and retaining member 182 and by its interconnection to housing 10 by bearing 202. Specifically, the splined connection between interface disc 168 and hub 148 allows interface disc 168 to cant in regard to hub 148 due to the float or play allowed by splines 158 and 176. Particularly, when fluid pressure is introduced into cylinder C through provisions 98, piston 90 moves in the axial direction towards interface disc 168 against the bias of springs 78 moving teeth 256 of interface disc 68 to engage with teeth 299 of interface disc 168. However, if the shafts received within hubs 48 and 148 are angularly misaligned, disc 68 will interface with disc 168 at an angle thereto making a single point contact rather than around the entire circumference of interface disc 68. Thus, the interface surface is greatly reduced resulting in disadvantageous operation including slippage causing higher heat generation, excessive wear or breakage of teeth 256 and 299 and interface discs 68 and 168, and reduced torque transfer. In the present invention if interface disc 68 makes a single point contact with interface disc 168, interface disc 168 will cant to mate with interface disc 68 around its entire circumference due to the splined connection of interface disc 168. Utilizing the present invention, in the range of three-fourths of a degree angular misalignment can be taken up or compensated for by clutch 10 according to the teachings of the present invention.

Additionally, according to the teachings of the present invention, utilizing air or other fluid to move the piston, rather than electricity, also compensates for shaft axial misalignment. Specifically, the sealing members shown in its most preferred form as T-seals 93 and 95 of piston 90 allow slop in T-seals 93 and 95 and the manufacturing tolerances allowed for shell 16 of housing 12 and piston 90. Thus, if interface disc 68 makes a single point contact with interface disc 168 due to the angular misalignment of the shafts within hubs 48 and 148, interface disc 68 may cant on hub 48 to allow mating of interface discs 68 and 168 around their entire circumferences. Therefore, due to the culminating effect of the splined connection of interface disc 168 and the use of air to axially move piston 90, larger angular misalignment of the shafts within hubs 48 and 148 can be compensated for utilizing the teachings of the present invention.

Furthermore, the slop in T-seals 93 and 95 and the manufacturing tolerances allowed for shell 16 of housing 12 and piston 90 also compensate for axial or horizontal misalignment. Specifically, if the shafts are not axially aligned, interface discs 68 and 168 will not rotate about the same axis resulting in an out of balance or non-concentric engagement of interface discs 68 and 168. Utilizing the present invention, interface disc 68 will self-align with respect to interface disc 168 due to the slop and tolerances of piston 90, shell 16, and T-seals 93 and 95 such that a concentric, balanced interface engagement occurs between interface discs 68 168. In the preferred embodiment, interface disc 68 will move radially in the range of 0.005 inch in providing for frictionally engaging self-alignment in the case of shaft axial misalignment.

Conventional control apparatuses such as clutches include the output rotatably mounted directly to the input by bearings. During normal use and operation of control apparatuses, various components wear and are prone to fail due to this wear. One such component is the bearings provided in such control apparatuses. Conventional control apparatuses with the output and input rotatably mounted to each other by bearings allow a path for power flow that can bypass the torque and/or rotational selective interface in the event of failure of the bearing between the input and output. Specifically, where bearings have failed, the balls and cage of the bearings may jam and lock between the inner and outer races of the bearing and thus allow torque to transfer through the bearings resulting in undesired mutual rotation of the input and output of the control apparatus. Such undesired mutual rotation may cause damage to the machinery which the apparatus controls, the work piece which is being operated upon by such machinery, and/or the personnel operating or attempting to repair or maintain such machinery.

It should be realized that the clutch according to the teachings of the present invention provides an additional advantage over prior rotational control apparatus, i.e., a fail-safe device for preventing power flow which bypasses the torque and/or rotational selective interface in the event of bearing failure. Specifically, in clutch 10 according to the teachings of the present invention, the input and output are rotatably mounted together by a stationary housing and are not rotatably mounted directly to each other. Therefore, no possible bypass paths are created such that power flow can occur between hubs 48 and 148 in the event of bearing failure and seizure as in conventional clutches.

Particularly, housing 12 is held from rotation by fluid provisions 98 and is otherwise free floating but rotatably supported on hubs 48 and 148 by bearings 102 and 202. If bearing 102 fails and locks, housing 12 would be locked with hub 48 and would rotate therewith, thus breaking fluid provisions 98 and deactivating clutch 10. Thus, if clutch 10 is deactivated when bearing 102 fails, discs 68 and 168 are not in an interfacing/torque transfering relation and housing 12 would rotate on hub 148 through bearing 202 and would not create a path for power flow that bypasses interface discs 68 and 168. On the other hand, if clutch 10 is activated when bearing 102 fails, housing 12 would begin to rotate with hub 48 breaking fluid provisions 98 and deactivating clutch 10 such that a path for power flow between hubs 48 and 148 would not exist or be created.

Similarly, if bearing 202 fails and locks, housing 12 would be locked with hub 148 and would rotate therewith. Thus, if clutch 10 is activated when bearing 202 fails, housing 12 would begin to rotate with hub 148 breaking fluid provisions 98 and deactivating clutch 10 such that a path for power flow between hubs 48 and 148 would not exist or be created. On the other hand, if clutch 10 is deactivated when bearing 202 fails, discs 68 and 168 are not in any interfacing/torque transfering relation, but the bearing failure does not matter since both hub 148 and housing 12 would be stationary. However, when clutch 10 was activated, housing 12 would rotate with hub 148 and break fluid provisions 98 deactivating clutch 10. Thus, a path for power flow that bypasses interface discs 68 and 168 would also not exist in the event of failure of bearing 202.

Therefore, the prevention of undesired rotation of the output caused by power flow bypassing the rotational interface of the control apparatus as the result of bearing failure is an other important advantage of clutch 10 according to the present invention over prior clutches. Specifically, such undesired rotation is usually unexpected and often produces catastrophic results possibly damaging the machine being powered by the output of the clutch, the work piece in the machine, and/or body parts of the operator located in the machine. This is especially important when it is desired to have the output always come to the same degrees of registry with the input, such as when the rotational control apparatus utilizes an interface of the preferred form of the present invention and the type and/or variety of U.S. Pat. No. 3,760,916.

It should further be appreciated that lip 268 and its axial capture with hub 48 locates housing 12 on hub 48 while still allowing housing 42 to be rotatably independent from hubs 48 and 148 and allowing clutch 10 to be freestanding from the shafts received in hubs 48 and 148.

In its most preferred form, twenty thousands of an inch nominal end float is provided between interface disc 168 and shoulder 164. It can then be appreciated that if the shaft extending into hub 148 extends too far into clutch 10, the shaft will carry hub 148 therewith until shoulder 164 of hub 148 abuts with hub 170 of interface disc 168. On the other hand, if the shaft extending into hub 48 extends too far into clutch 10, the shaft will carry hub 48 and housing 12 therewith due to the axial capture of lip 268 between shoulder 64 and retaining ring 270. Interface disc 168 is also carried by housing 12 due to their common connection through bearing 202 until hub 170 of interface disc 168 abuts with shoulder 164 of hub 148. Therefore, the construction of the present invention allows for variation in the location and securement of clutch 10 to the shafts.

Furthermore, the axial capture of housing 12 by lip 268, shoulder 64, and retaining ring 270 also prevents housing 12 from settling under the force of gravity when clutch 10 is utilized in a vertical orientation with vertically arranged shafts. Specifically, without axial securement and with both interface discs being slideable, the housing mounted to the interface discs would settle under the force of gravity in a vertical orientation pulling the interface discs with them. This gravity settling may result in an interference with the free float of the shaft and in the placement of an end load on the shaft, undesirable conditions.

Additionally, with both interface discs being slideable and with the housing mounted thereto, the housing may have a tendency to vibrate on hubs 48 and 148 due to their loose rotatable and slideable interconnection thereto. Further, the housing may have a tendency to bump back and forth on hubs 48 and 148 by the tolerances provided between discs 68 and 168 and shoulders 64 and 164 and by manufacturing tolerances. The axial capture of housing 12 on hub 48 by lip 268, shoulder 64, and retaining ring 270 acts to prevent these disadvantageous tendencies by holding the housing 12 in the same axial position on hub 48 to prevent axial movement of housing 12 with respect to the shafts being controlled.

It should then be appreciated that it is the intent of clutch 10 of the present invention to be free standing from the machinery or the like being controlled by clutch 10. Specifically, the placement of end loads on the shafts or like interference with the free floating nature of the shafts to be controlled may result in force transfer to the controlled machinery for which they were not originally designed to accept. The axial capture of housing 12 by lip 268, shoulder 64, and retaining ring 270 plays an important role in achieving this desired, free standing intent.

Now that the basic teachings of the present invention have been explained, many extensions and variations will be obvious to one having skill in the art. For example, in its most preferred form, disc 168 is the drive or input of clutch 10 because greater heat distribution is allowed through shell section 14 of housing 12 than through shell section 16 of housing 12. However, if desired, disc 168 can be operated as the driven disc and disc 68 can be operated as the drive disc according to the teachings of the present invention.

It should be appreciated that the teachings of the present invention can be utilized in combination with other rotational control apparatuses. For example, provisions can be utilized to brake hub 48 when disc 68 is not in an interface engaging relation with interface disc 168. Such further combinations may be obvious to persons skilled in the art after the teachings of the present invention are known.

Likewise, it can be appreciated that clutch 10 can be utilized to couple shafts having different diameters as shown in the drawings, with either the drive or driven shaft being of a smaller diameter or to couple shafts having the same diameters.

Similarly, although the input and output interfaces of clutch 10 according to the preferred embodiment of the present invention are shown and described as teeth 256 and 299, it can be realized that other types and constructions of interfaces can be utilized in conjunction with the teachings of the present invention.

Additionally, although the present invention has been shown and described in its most preferred form as being utilized in a clutch of the type and variety of U.S. Pat. No. 3,760,916, it can be appreciated that the teachings of the present invention may be utilized in other types and constructions of rotational control apparatus after they become known by persons skilled in the art. For example, although balls 100b, 102b, and 104b of the registry type clutch are more prone to dislodge resulting in unwarranted clutch engagement, the teachings of the present invention may be utilized to provide a unique relationship between the distance or gap between the interface members of the rotational control apparatus and the longest dimension of the part or component of the rotational control apparatus most likely to dislodge and jam in the interface members of the rotational control apparatus resulting in unwarranted engagement of the rotational control apparatus.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Coupling clutch comprising, in combination: a first hub for receipt of a first shaft in a non-rotatable condition; a second hub for receipt of a second shaft in a non-rotatable condition; a first interface disc; means for slideably mounting the first interface disc on the first hub; means for biasing the first interface disc in a first axial direction towards a first axial position on the first hub; means for moving the first interface disc in the opposite axial direction towards a second axial position; a second interface disc, with the second interface disc being selectively engageable with the first interface disc to rotatably relate the first interface disc and the second interface disc; means for slideably mounting the second interface disc on the second hub; and means for substantially preventing slideable movement of the second interface disc with respect to the second hub and for allowing the canting of the second interface disc with respect to the second hub to take up angular misalignment of the first and second shafts; a housing; means for mounting the housing on the first interface disc for axial movement therewith and for rotation of the housing relative to the first interface disc; means for mounting the housing on the second interface disc for axial movement therewith and for rotation of the housing relative to the second interface disc; and means for axially capturing the housing on one of the first and second hubs for preventing relative axial movement of the housing with respect to the hub, with the axially capturing means allowing rotation of the housing relative to the hub.

2. The coupling clutch of claim 1 wherein the axially capturing means comprises, in combination: a radially extending lip formed on the housing; and means formed on one of the first and second hubs for axially capturing the lip of the housing.

3. The coupling clutch of claim 2 wherein the lip capturing means comprises, in combination: a shoulder formed on the first hub for abutting with the lip of the housing; and means for retaining the lip of the housing on the first hub, with the lip of the housing being captured between the shoulder and the retaining means.

4. The coupling clutch of claim 3 further comprising, in combination: a first bushing bumper located between the shoulder of the first hub and the lip of the housing; and a second bushing bumper located between the lip of the housing and the retaining means.

5. The coupling clutch of claim 3 wherein the retaining means comprises, in combination: a retainer ring received in a radially extending cavity formed in the first hub.

6. The coupling clutch of claim 1 wherein one of the first and second interfaces discs includes a multiplicity of projection-receiving cavities; with the other of the first and second interface discs including a projection carrier ring having a multiplicity of projections for engagement with the cavities, with the cavities and projections arranged so that at least in a first registry position the projections overlie the cavities allowing the interface discs to rotatably relate the first hub with the second hub and when the projections and cavities are not in the first registry position the interface discs are prevented from rotatably relating the first hub with the second hub; wherein the projection carrier ring comprises, in combination: a flat, radially disposed ring portion terminating in its inner edge in a right angular annular inner flange; and projection receiving sockets for capturing the projections, with the right angular annular inner flange located radially inward of the projections tending to allow any dislodged projections to travel radially outward of the clutch and tending to prevent the dislodged projection from traveling radially inward of the clutch and between the interface discs of the clutch and jamming between the interface discs causing unwarranted engagement of the clutch.

7. The coupling clutch of claim 6 wherein the distance between the first and second interface discs in the second axial position is larger than the projections for aiding in the prevention of any dislodged projection from jamming between the first and second interface discs and causing unwarranted engagement of the clutch.

8. The coupling clutch of claim 7 wherein the interface disc has a periphery having a diameter greater than the radial extent of the projection receiving cavities, and wherein the projection receiving cavities are located radially inward of the periphery of the interface disc forming a solid ring of material between the radial extent of the projection receiving cavities and the periphery of the interface disc to allow the interface disc to be more rigid and less likely to distort during heat treatment.

9. The coupling clutch of claim 8 wherein the interface disc further comprises, in combination: an annular cavity for receiving the right angular annular inner flange of the projection carrier ring when the first and second interface discs are rotatably related.

10. The coupling clutch of claim 1 wherein one of the first and second interface discs includes a multiplicity of projection-receiving cavities; with the other of the first and second interface discs including a multiplicity of projections for engagement with the cavities, with the cavities and projections arranged so that at least in a first registry position the projections overlie the cavities allowing the interface discs to rotatably relate the first hub with the second hub and when the projections and cavities are not in the first registry position the interface discs are prevented from rotatably relating the first hub with the second hub; and wherein the distance between the first and second interface discs in the second axial position is larger than the projections for tending to prevent any dislodged projection from jamming between the first and second interface discs and causing unwarranted engagement of the clutch.

11. The coupling clutch of claim 10 wherein the projections are balls each having a diameter.

12. The coupling clutch of claim 1 wherein the moving means comprises, in combination: a piston reciprocally received in the housing; and a cylinder for receipt of fluid pressure for reciprocating the piston within the housing; and wherein the means for mounting the housing on the first interface disc comprises, in combination: means for axially relating the piston and the first interface disc and for rotatably mounting the piston on the first interface disc, wherein in the event of failure of the housing mounting means, the housing rotates with the interface disc causing the interruption of the receipt of fluid pressure to the cylinder.

13. The coupling clutch of claim 12 further comprising, in combination: means for sealing between the piston and the housing; and wherein the first interface disc engages with the second interface disc in its second axial position; wherein the tolerances of the piston and the cylinder and the sealing means allow the canting of the first interface disc with respect to the first hub to take up horizontal misalignment of the first and second shafts.

14. The coupling clutch of claim 12 further comprising, in combination: a radially extending annular leg integrally formed on the piston; circumferentially spaced apertures formed in the annular leg of the piston;

torque pins axially extending from the housing and through the apertures of the annular leg of the piston for slideably mounting and rotatably relating the piston to the housing.

15. The coupling clutch of claim 14 wherein the biasing means comprises, in combination: springs received on the torque pins and abutting and extending between the annular leg of the piston and the housing.

16. Clutch comprising, in combination: a first interface disc; means for slideably mounting the first interface disc along a clutch axial axis; means for biasing the first interface disc in a first axial direction towards a first axial position on the clutch axial axis; means for moving the first interface disc on the clutch axial axis in the opposite axial direction towards a second axial position; a second interface disc, with the second interface disc being selectively engagable with the first interface disc to rotatably relate the first interface disc and the second interface disc; means for slideably mounting the second interface disc along the clutch axial axis; a housing; means for mounting the housing on the first interface disc for axial movement therewith and for rotation of the housing relative to the first interface disc; means for mounting the housing on the second interface disc for axial movement therewith and for rotation of the housing relative to the second interface disc; and means for axially capturing the housing for preventing relative axial movement of the housing along the clutch axial axis, with the axially capturing means allowing rotation of the housing relative to the clutch axial axis.

17. The clutch of claim 16 further comprising, in combination: a first hub for receipt of a first shaft in a non-rotatable condition; a second hub for receipt of a second shaft in a non-rotatable condition; with the first interface disc being slideably mounted on the first hub; with the second interface disc being slideably mounted on the second hub.

18. The clutch of claim 17 wherein the axially capturing means comprises, in combination: a radially extending lip formed on the housing; and means formed on one of the first and second hubs for axially capturing the lip of the housing.

19. The clutch of claim 18 wherein the lip capturing means comprises, in combination: a shoulder formed on the first hub for abutting with the lip of the housing; and means for retaining the lip of the housing on the first hub, with the lip of the housing being captured between the shoulder and the retaining means.

20. The clutch of claim 19 further comprising, in combination: a first bushing bumper located between the shoulder of the first hub and the lip of the housing; and a second bushing bumper located between the lip of the housing and the retaining means.

21. The clutch of claim 16 further comprising, in combination: means for substantially preventing slideable movement of the second interface disc with respect to the second hub and for allowing the canting of the second interface disc with respect to the second hub to take up angular misalignment of the first and second shafts.

* * * * *